United States Patent [19]
Withers, Jr.

[11] Patent Number: 5,359,333
[45] Date of Patent: Oct. 25, 1994

[54] ROBUST MULTIPLE COCHANNEL EMITTER DETECTORS

[75] Inventor: Langhorne P. Withers, Jr., Springfield, Va.

[73] Assignee: E-Systems, Inc., Dallas, Tex.

[21] Appl. No.: 94,350

[22] Filed: Jul. 21, 1993

[51] Int. Cl.$^5$ ............................ G01S 3/16; G01S 3/28
[52] U.S. Cl. ...................................... 342/378; 342/195
[58] Field of Search ................................. 342/378, 195

[56] References Cited
U.S. PATENT DOCUMENTS

| | | | |
|---|---|---|---|
| 3,725,922 | 4/1973 | Brennan et al. | |
| 4,641,259 | 2/1987 | Shan et al. | 364/724 |
| 4,931,977 | 6/1990 | Klemes | 364/581 |
| 5,255,210 | 10/1993 | Gardner et al. | 364/574 |
| 5,262,785 | 11/1993 | Silverstein et al. | 342/162 |

Primary Examiner—Theodore M. Blum
Attorney, Agent, or Firm—Rogers & Killeen

[57] ABSTRACT

A system and method for estimating the number of emitters having wavefronts impinging on an array of m sensors may be used in the presence of correlated, unequal-level, as well as uncorrelated, equal-level noise. In the invention, the m eigenvalues of the sensor correlation matrix are evaluated to determine whether they are related to noise or to signals. Each eigenvalue, scaled by the estimated noise power level, is compared to the arithmetic mean of the preceding noise eigenvalues to determine whether the difference is enough to indicate the presence of a signal. Similarly, the successive slopes (differences between each scaled eigenvalue and its predecessor) may be compared to the arithmetic mean of the preceding slopes to make the determination. In an alternative embodiment, the eigenvalues are desensitized by increasing each by an amount not much larger than the first noise eigenvalue. The invention finds application in existing systems that use an eigenstructure approach to determine various characteristics of the signals forming the impinging wavefronts.

23 Claims, 2 Drawing Sheets

ROBUST MULTIPLE COCHANNEL EMITTER DETECTORS

BACKGROUND OF THE INVENTION

The present invention is directed to a method and system for estimating the number of emitters having signals received by an array of sensors, and more specifically to an improved method and system for estimating the number of emitters having wavefronts impinging on an antenna array that may be used to improve existing systems that determine various characteristics of those wavefronts.

The identification of the characteristics (such as direction of arrival, strength, frequency, etc.) of wavefronts impinging on an array of sensors is of importance in a wide variety of applications, including radio direction finding, radar, sonar, surveillance, medical imaging, geophysics, etc. Several methods and systems have been developed to identify these characteristics, with the most promising relying on the eigenstructure approach developed by R. O. Schmidt in his Ph.D. thesis entitled "A Signal Subspace Approach to Multiple Emitter Location and Spectral Estimation", Stanford University, 1981 (the method therein is known as MUSIC). MUSIC has been changed and updated (see, for example, the ESPRIT algorithm discussed in U.S. Pat. No. 4,965,732 issued to Roy, et al. on Oct. 23, 1990) and many other methods and systems are known.

The need to accurately estimate of the number of emitters having wavefronts impinging on the sensor array is critical to the accurate estimate of wavefront characteristics in all of the above-identified methods and systems. Prior art methods and systems that rely on eigenvalues to determine the number of emitters include the Minimum Description Length (MDL) and Akaike Information Criterion (AIC) methods, and the Williams and Johnson Sphericity Test. Nevertheless, the prior art methods and systems typically overestimate the number of wavefront emitters, sometimes quite badly. As will be discussed in more detail below, one of the problems associated with the prior art estimation of the number of emitters is that they are not robust to relaxing the assumption that noise is uncorrelated and of equal power at each sensor. That is, they do not handle correlated, unequal-level noise as well as uncorrelated, equal-level noise and, as a result, overestimate the number of emitters.

The operation of the prior art methods and systems for determining the characteristics of wavefronts is beyond the scope of the present invention and will not be discussed herein as those methods and systems are known or available through other sources to ones of skill in the art. However, a brief description of a prior art technique for estimating the number of emitters follows to assist in understanding the present invention.

The response of an array of m sensors to a unit-energy plane wavefront arriving from the direction $\theta$ is a complex m×1 vector, typically identified as a steering or direction vector:

$$a_\theta = (a_1, a_2, \ldots, a_m)^T \quad (1)$$

where $T$ indicates the transpose.

When n signals, $x_1[t], x_2[t], \ldots, x_n[t]$, are carried on planewaves with the same wavelength, but different directions, into the sensor array, the superimposed response of the array to the planewaves is $$y[t] = \sum_{k=1}^{n} x_k[t] a_k + n[t] = Ax[t] + n[t] \quad (2)$$

where n[t] is the vector of noise received across the array from the sensor system and background;
$A = [a_1, a_2, \ldots, a_n]$; and
$x = (x_1[t], x_2[t], \ldots, x_n[t])^T$.

The array sample at each time t, y[t], is identified herein as a snapshot. It is assumed that the signals $x_k[t]$ change slowly enough so that, at any point in time, their value is simultaneously equal across the array. The sensor correlation matrix $E(y[t]y^*[t])$ is denoted by R, and the signal correlation matrix $E(x[t]x^*[t])$ by S, both being stationary in time. The prior art methods and systems assume that the noise is independent in time, uncorrelated across sensors, and of equal power at each sensor, with covariance matrix $$Q = E(n[t]n^*[t]) = \sigma^2 I \quad (3)$$

In these terms, it follows that R has a linear structure given by $$R = ASA^* + \sigma^2 I \quad (4)$$

with eigenvalues $0 \leq \lambda_1 \leq \lambda_2 \leq \ldots \leq \lambda_m$.

From the linear structure of equation (4) it is apparent that those vectors orthogonal to the columns of A are eigenvectors with eigenvalues all equal to the noise power $\sigma^2$. For n signals, there will be m−n of these noise eigenvalues. If there is only one planewave signal present of power $\sigma_1^2$, there are m−1 noise eigenvalues and one signal eigenvalue equal to the signal power $\sigma_1^2$. The corresponding signal eigenvector is the steering vector. However, this pattern does not continue for more than one signal. For uncorrelated signals $$S = \text{diag}(\sigma_1^2, \ldots, \sigma_n^2) \quad (5)$$

and the signal eigenvectors are not the direction vectors, but they do span the same linear subspace. (This is the basis of MUSIC.) The average of the eigenvalues is the total signal and noise power as set forth below:

$$\frac{1}{m} \sum_{k=1}^{m} \lambda_k = \sum_{j=1}^{n} \sigma_j^2 + \sigma^2 \quad (6)$$

or, in other words, $$\frac{1}{m} tr(R) = tr(S) + \sigma^2 \quad (7)$$

To prove this, using the structure of R as in equation (4), note that (for A* defined as the complex conjugate transpose of the matrix A), $$\begin{aligned} tr(ASA^*) &= tr(SA^*A) \\ &= tr(\text{diag}(m\sigma_1^2, \ldots m\sigma_n^2) + \\ &\quad tr(\text{a matrix with 0-diagonal}) \\ &= m \sum_{j=1}^{n} \sigma_j^2 \end{aligned} \quad (8)$$

and that the steering vectors (columns of A) ideally have constant norm-squared m.

The relationship of equation (6) means that the arithmetic mean (AM) of the eigenvalues will be the same for any array, of any number of elements, receiving signals of these powers from any directions. The geometry does not affect the AM($\lambda_1, \ldots, \lambda_m$).

With reference to the MDL (Minimum Description Length) and AIC (Akaike Information Criterion) methods, it is noted that both use only the number of snapshots N and the eigenvalues $\lambda_1, \ldots, \lambda_m$ of the sensor correlation matrix R. Both MDL and AIC take the number of emitters n as the value of m−k for which the flatness (or levelness) of the first k "noise" eigenvalues, plus a correction term, is minimum. The flatness measure is basically the ratio of the geometric mean (GM) to the arithmetic mean (AM) of the $\lambda$'s. The arithmetic mean is the usual average. The geometric mean is the length of the side of a k-dim cube with volume equal to a k-dim box with sides $\lambda_j$. Therefore $0 \leq GM/AM \leq 1$, since the eigenvalues are not negative. The ratio GM/AM equals 1 only when the graph of the eigenvalues is flat. The closer the ratio is to 1, the more nearly equal the k numbers are. MDL and AIC (and the Williams Johnson Sphericity Test) evaluate the flatness of the first k eigenvalues. They basically use the logarithm of $(GM/AM)^k$ for the flatness f; that is $$f = -\log_e \left(\frac{GM}{AM}\right)^k = -\log_e \left( \frac{\prod_{j=1}^{k} \lambda_j}{\left(\frac{1}{k} \sum_{j=1}^{k} \lambda_j\right)^k} \right) \quad (9)$$

MDL adds to this the correction term $$(m^2 - k^2) \frac{\log N}{2N},$$

and sets n=m−k when the flatness plus the correction is minimum.

Interpreting f as flatness helps to explain why it is not a robust statistic. For example, consider the flatness of n numbers all equal to 1, except for one equal to x. Before the log, it is $$f = \frac{x}{\left(\frac{1}{n}(n-1+x)\right)^n} \quad (10)$$

$$= \frac{x}{\left(1 - \frac{1-x}{n}\right)^n} \quad (11)$$

$$\rightarrow e \cdot xe^{-x}, \text{ as } n \rightarrow \infty. \quad (12)$$

With reference to FIG. 1, for large x (as for a signal eigenvalue k well above the noise level $\sigma^2 = 1$), the flatness f will tend to go down from one toward zero. This is good, for it says that this flatness measure will catch sudden jumps above the noise floor. However, for small x (as x→0), the flatness will also tend toward 0. This is not good, because it means that when the noise eigenvalues are increasing (due to correlated noise) our flatness measure will tend to think the noise eigenvalues are not very flat. Either way, the flatness slides off the peak at x=1.

By way of further explanation, the spectrum of five eigenvalues (for five sensors, m=5) in the presence of uncorrelated noise may be seen in FIG. 2. In this example, there are two signal eigenvalues (values 4 and 5) and three noise eigenvalues (values 1-3). The three noise eigenvalues are relatively flat and are thus distinguishable from the signal eigenvalues. Prior art methods and systems would likely be able to correctly estimate the presence of the two signal sources. They work roughly as follows: assuming the first eigenvalue is a noise eigenvalue, they continue to add one more candidate noise eigenvalue and test for flatness f until the test indicates they are no longer flat. All remaining eigenvalues are assumed to be signal related. This procedure is usually adequate when the eigenvalues are as illustrated in FIG. 2. However, in the presence of correlated noise, the noise eigenvalues are not as flat, as may be seen by reference to FIG. 3. As seen therein, the prior art would look at the first three eigenvalues only and the third noise eigenvalue would likely not pass the flatness test. The test would likely indicate that only the first two eigenvalues are noise related, and, as a result, the number of emitters would be overestimated by one (that is, the test would indicate the presence of three emitters, not two).

The prior art techniques fail because they are, in effect, near-sighted. The problem with this is that the flatness test is a microscope; it only sees the noise eigenvalues at hand, and does not see them in relation to the rest of the eigenvalues. Thus, we are easily able to see that the first three eigenvalues in FIG. 3 are essentially flat when viewed in the context of all five eigenvalues. However, the prior art techniques are not aware of the two signal eigenvalues as they evaluate the flatness of the three noise eigenvalues. Under the microscope of the prior art techniques, the three noise eigenvalues, perturbed as a result of coherent noise, are given a poor intrinsic flatness rating, and the test declares that only the first two locally flat eigenvalues are noise. The prior art techniques resist including the third noise eigenvalue, preferring to stick with just the first two. Thus the noise count is low, producing high signal counts.

Accordingly, it is an object of the present invention to provide a novel method and system for estimating the number of emitters that obviates the problems of the prior art.

It is a further object of the present invention to provide a novel method and system for estimating the number of emitters in which the sensitivity to eigenvalue flatness is reduced by increasing the eigenvalues.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
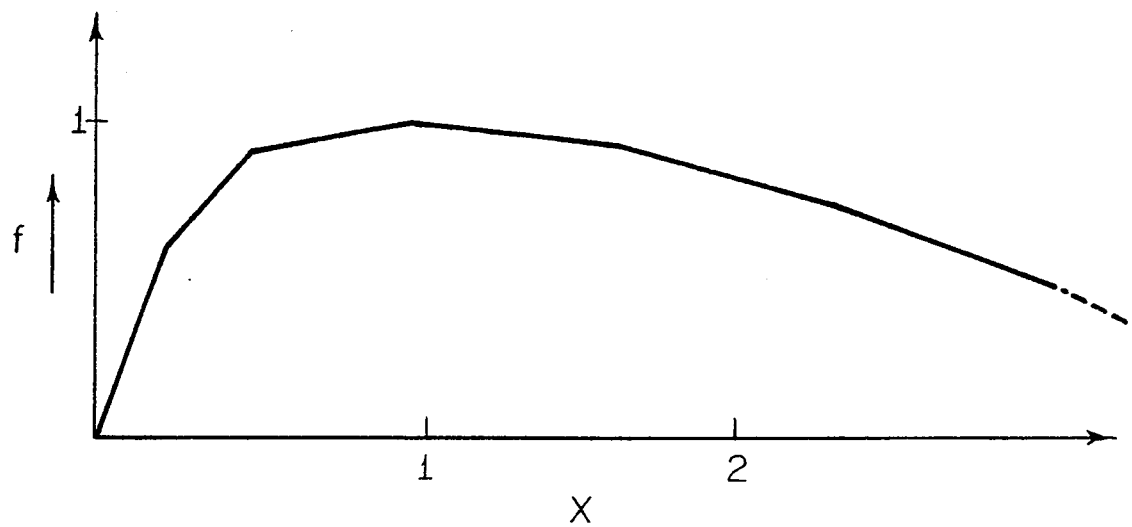
FIG. 1 is a graphical depiction of the asymptotic flatness f for many eigenvalues, all equal to 1, except for one eigenvalue x that varies.
Figure 2:
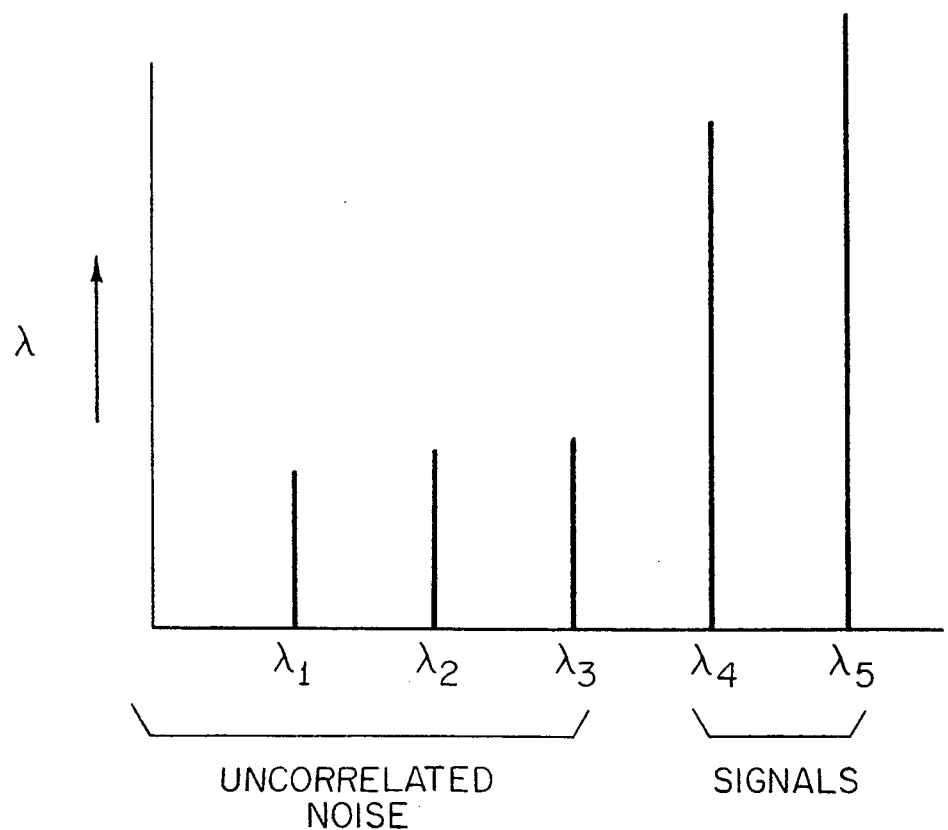
FIG. 2 is a graphical depiction of eigenvalues from prior art methods and systems illustrating the presence of uncorrelated sensor noises of equal power levels.
Figure 3:
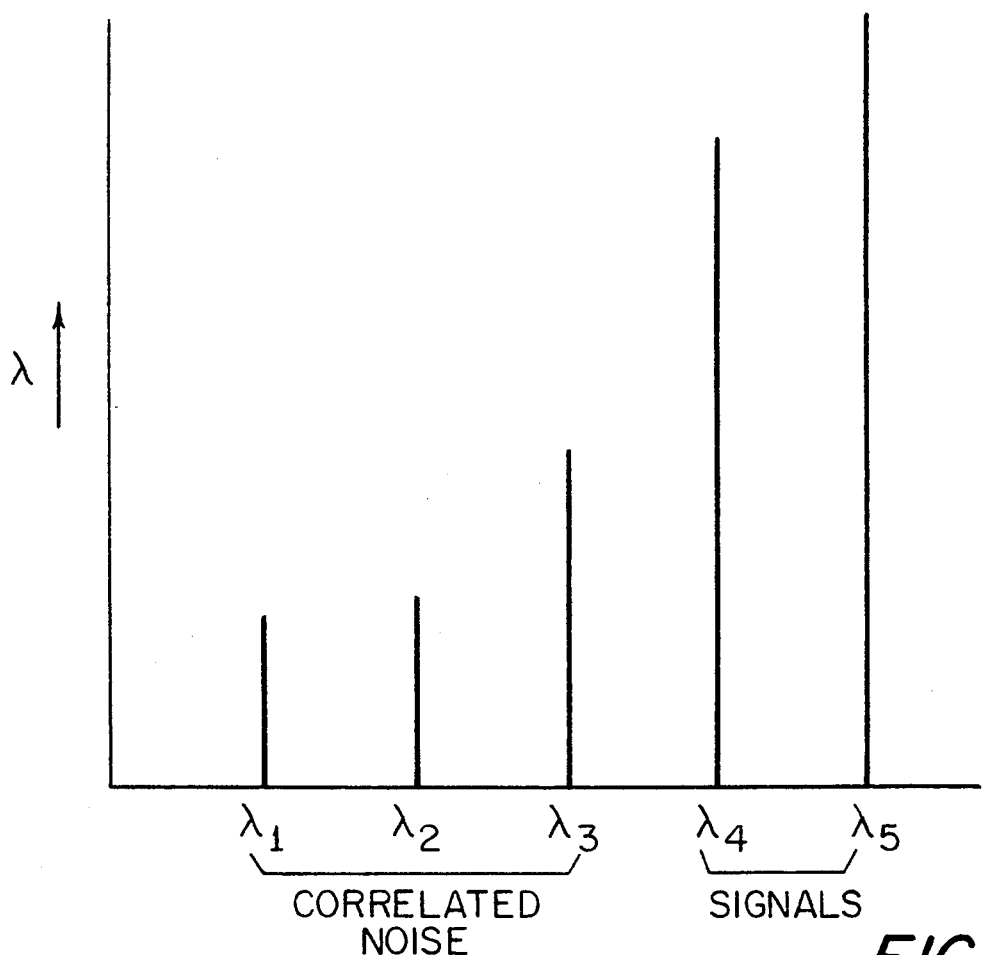
FIG. 3 is a graphical depiction of eigenvalues from prior art methods and systems illustrating the presence of correlated unequal power noise.

In an embodiment of the system and method of the present invention, the statistical evaluation of flatness f is replaced by a more heuristic technique that relies on the square root of the arithmetic mean (AM) of the full set of eigenvalues, $\sqrt{AM}$. It has been determined that this value is a reasonable threshold for the level of change that may be tolerated to accept the next eigenvalue as a noise eigenvalue. As illustrated in Equation (6), this value does not vary with the number of sensors, and depends only on the signal power, $\sigma_j^2$, and the noise power, $\sigma^2$. Before the AM is determined, the eigenvalues (having been determined as set forth above) are scaled by dividing each by $\sigma^2$, where $\sigma^2$ is estimated to be the eigenvalue $\lambda_1$ (the first noise eigenvalue), as follows:

$$\lambda_j' = \lambda_j/\lambda_1, \quad (13)$$

for $j = 1, 2, \ldots, m$.

These scaled eigenvalues may be thought of intuitively as "signal-to-noise" ratios.

The method begins with a global flatness check to determine whether a signal is present at all. That is, $$\text{if } (AM/GM) \leq 1 - \delta; \; n = 0 \quad (14)$$

where n is the number of emitters, $\delta$ is a constant approximately equal to $1 - 1\frac{1}{4}$, and AM and GM are as shown in equation (9).

If $n \neq 0$, the method of the present invention checks each of the subsequent scaled eigenvalues $\lambda_k'$, one at a time, stepping k from 1 to m, to determine (1) whether the eigenvalue jumps too far above the current AM of the preceding scaled eigenvalues $\lambda'_{k-1}, \ldots, \lambda'_1$, or (2) whether the slope of the eigenvalue jumps too far above the current mean of the slopes of the preceding scaled eigenvalues (the slopes being the differences between each scaled eigenvalue and its predecessor). If either condition is satisfied, k is declared the number of noise eigenvalues and n (the number of emitters) is equal to m (the total number of eigenvalues) minus k; that is, $n = m - k$. These steps are set forth below (assuming $n \neq 0$):

begin with $k = 1$, $\lambda = \lambda'_1 = 1$, and $\mu' = 0$ then test $$\lambda_k' - \bar{\lambda} < \alpha_k \sqrt{AM_\lambda}, \text{ and} \quad (1)$$

$$\mu_k - \bar{\mu} < \beta_k \sqrt{AM_\mu}, \quad (2)$$

where threshold coefficients $\alpha_k \approx \frac{1}{2}$ and $\beta_k \approx \frac{1}{2}$ for correlated, unequal-level noise and $\alpha_k \approx 1$ and $\beta_k \approx 0.3$ for uncorrelated, equal-level noise, although they may (optionally) vary with the noise count k, and where $AM_\lambda$ is the arithmetic mean of the full set of m scaled eigenvalues, and $AM_\mu$ is the arithmetic mean of the m−1 slopes (consecutive differences) of the scaled eigenvalues.

If one of the conditions is not satisfied, end the check, and if both of the conditions are satisfied, proceed to update the arithmetic means with, $k = k + 1$, $\lambda = \lambda + \frac{1}{k}(\lambda_k - \bar{\lambda})$, $\mu_k = \lambda_k - \lambda_{k-1}$, and $\mu < \mu + \frac{1}{k-1}(\mu_k - \mu)$ until one of the conditions is not satisfied.

In effect, the two tests (1) and (2) above are first and second derivatives of the eigenvalues. When the number m is very large, it may be appropriate to establish a further check that is a "third" derivative in the same manner.

In an alternative embodiment of the present invention, each of the unscaled eigenvalues $\lambda_k$ may be increased by an amount $\Delta$ to decrease the relative variation of the noise eigenvalues when they are evaluated in the method discussed above, or when they are evaluated in the prior art systems (e.g., MDL or AIC). The amount $\Delta$ is preferably not much larger than the noise floor, and may be estimated as $\Delta = \alpha_k \sqrt{AM}$, where AM is the arithmetic mean of all of the scaled eigenvalues $\lambda_k'$ ($k = 1, 2, \ldots, m$) and $\alpha_k \approx 2$ or other suitable constant appropriate for a particular application. Thereafter, the flatness f may be evaluated as set forth in Equation (9), stepping k from 1 to m, with $n = m - k$ when f is minimized. Scaling as shown in Equation (13) does not affect the ratio GM/AM in Equation (9), although it does affect the shift distance $\Delta$.

Figure 4:
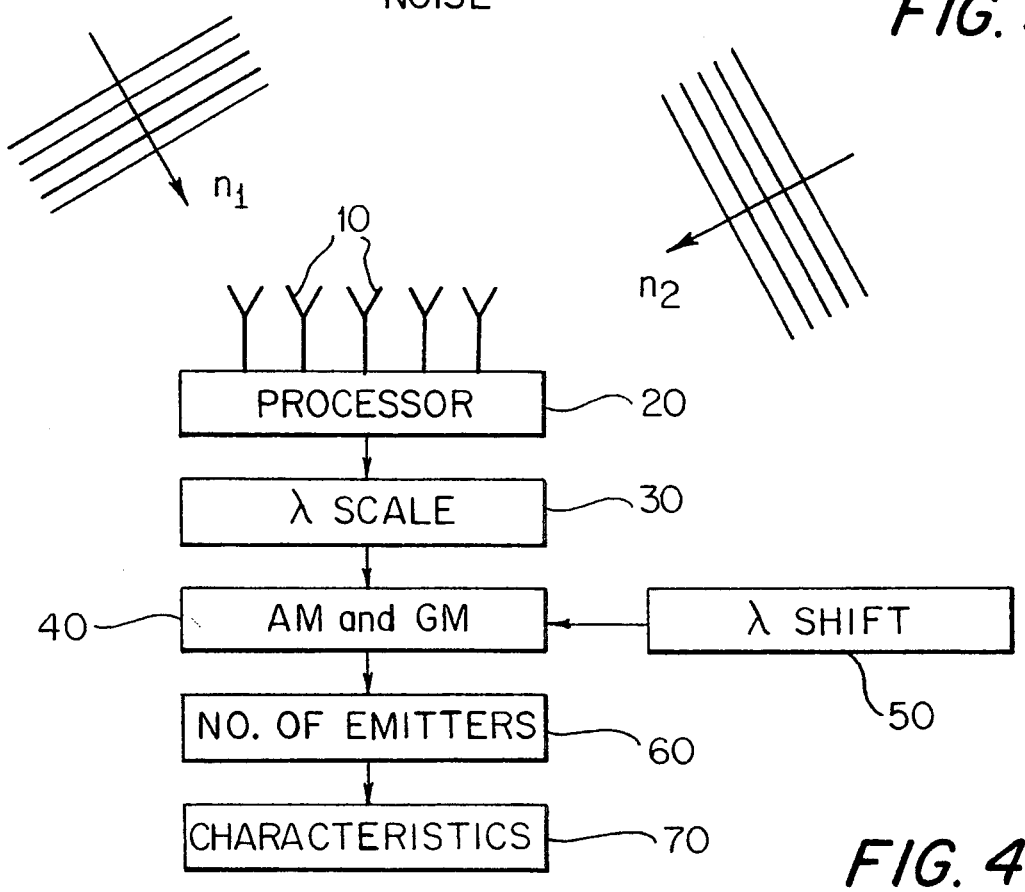
FIG. 4 is a block diagram of an embodiment of the present invention.

With reference now to FIG. 4, the system of the present invention may include m plural antennae 10 for sensing signals from the n emitters. The m antennae 10 will also sense noise and the system itself will have noise, all of which is referred to herein as sensed noise. The sensor correlation matrix of the sensed signals and noise, and the eigenvalues $\lambda_m$ thereof are identified in a processor 20. The system includes further components for scaling the eigenvalues 30, determining the AM and GM 40, increasing the eigenvalues by $\Delta$ 50 and for evaluating the number of emitters 60, as determined by the technique being used. The number of emitters may be provided to a system 70 for determining the characteristics of the sensed signals, such as the MUSIC system discussed above.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A method of identifying characteristics of signals impinging on an array of sensors that requires an estimate of the number of emitters having signals impinging on the array of sensors, in which a method of estimating the number of the emitters n comprises the steps of:

(a) providing an array of m sensors for receiving the impinging signals in the presence of noise;

(b) sensing the impinging signals from the n emitters and the noise at the array of m sensors;

(c) processing the sensed signals and noise to identify a sensor correlation matrix and the m eigenvalues $\lambda_k$ (k=1, ..., m) thereof;

(d) scaling said eigenvalues $\lambda_k$ by dividing each by noise power $\sigma^2$ to create scaled eigenvalues $\lambda_k'$;

(e) evaluating the difference between a scaled eigenvalue $\lambda_k'$ and an arithmetic mean of the scaled eigenvalues $\lambda_1'$, ..., $\lambda_{k-1}'$ to determine whether $\lambda_k'$ increases sufficiently to declare n=m−k, stepping k from 1 to m until the increase is sufficient; and (f) providing the declared number of emitters n so that the characteristics of the impinging signals can be determined.

2. The method of claim 1 further comprising, after step (d), the steps of determining an arithmetic mean (AM) and a geometric mean (GM) of the scaled eigenvalues $\lambda_k'$ and using the ratio AM/GM to determine if the number of emitters n=0.

3. The method of claim 1 where the increase in scaled eigenvalue $\lambda_k'$ from scaled eigenvalue $\lambda_{k-1}'$ is sufficient to declare n=m−k when $$\lambda_k' - \lambda \geq \alpha_k \sqrt{AM_\lambda},$$

where $\lambda$ is the arithmetic means of the k−1 scaled eigenvalues $\lambda_1'$, ..., $\lambda_{k-1}'$ and $AM_\lambda$ is the arithmetic mean of all the m scaled eigenvalues $\lambda_k'$.

4. The method of claim 3 where $\alpha_k \approx 1$ for uncorrelated, equal-level noise and $\alpha_k \approx \frac{1}{2}$ for correlated, unequal-level noise.

5. The method of claim 3 further comprising the step of declaring n=m−k for k increasing in integer steps, when the test of claim 3 is met or when $$\mu_k - \mu \geq \beta_k \sqrt{AM_\mu},$$

where $\mu_k$ is the slope of the scaled eigenvalue $\lambda_k'$, $\mu$ is the arithmetic mean of the first k−1 scaled eigenvalue slopes $\mu_1, ..., \mu_{k-1}$, and $AM_\mu$ is the arithmetic mean of the m−1 eigenvalue slopes $\mu_k$.

6. The method of claim 5 where $\beta_k \approx \frac{1}{2}$ for correlated, unequal-level noise and $\beta_k \approx 0.3$ for uncorrelated, equal-level noise.

7. A method of identifying characteristics of signals received by an array of sensors in the presence of noise in which the method of estimating the number of emitters n having signals received by the array of m sensors comprises the steps of:

(a) providing an array of m sensors for receiving the signals in the presence of noise;

(b) sensing the signals from the n emitters and the noise at the array of m sensors;

(c) processing the received signals and noise to identify a sensor correlation matrix and the eigenvalues thereof;

(d) evaluating the difference between one of the eigenvalues and the average of preceding ones thereof to determine whether the one eigenvalue is related to noise; and (e) providing the results of the evaluation in step (d) so that the characteristics of the received signals can be determined.

8. The method of claim 7 wherein the one eigenvalue is related to noise when the difference between the one eigenvalue and the average of preceding eigenvalues is less than a constant times the square root of the arithmetic mean of all of the eigenvalues.

9. The method of claim 7 further comprising the step of determining whether the one eigenvalue is related to noise by comparing the slope of the eigenvalue to the average of the slopes of the preceding eigenvalues.

10. A method of estimating the number of emitters n having signals received by an array of sensors in the presence of noise comprising the steps of:

(a) providing an array of m sensors for receiving signals from n emitters in the presence of noise;

(b) sensing the signals from the n emitters and the noise at the array of m sensors;

(c) processing the received signals and noise to identify a sensor correlation matrix and the m eigenvalues $\lambda_k$ (k=1, ..., m) thereof;

(d) scaling said eigenvalues $\lambda_k$ by dividing each by noise power $\sigma^2$ to create scaled eigenvalues $\lambda_k'$;

(e) increasing each of the scaled eigenvalues $\lambda_k'$ by an amount $\Delta$ that is approximately the noise power $\sigma^2$ to create revised eigenvalues $\lambda_k'' = \lambda_k' + \Delta$;

(f) evaluating the flatness f of the revised eigenvalues to provide an estimate of n, the number of emitters; and (g) providing the evaluated number of emitters n to a device in which the characteristics of the signals are determined using the number of emitters n.

11. The method of claim 10 wherein the noise power $\sigma^2$ is approximately equal to $\lambda_1$, the first one of said eigenvalues $\lambda_k$.

12. The method of claim 10 further comprising the step of determining an arithmetic mean (AM) of the first k scaled and shifted eigenvalues, wherein the amount $\Delta = \alpha_k \sqrt{AM}$.

13. The method of claim 10 further comprising the step of determining a geometric mean (GM) and an AM of the first k scaled and shifted eigenvalues and wherein the flatness f is evaluated using the equation $f = -\log_e(GM/AM)^k$, stepping k from 1 to m, with n=m−k when f is minimized.

14. A system for identifying the characteristics of signals received by an array of sensors in the presence of noise that requires an estimate of the number of emitters having signals received by the array of sensors in which the subsystem for estimating the number of emitters n having signals received by the array of sensors comprises:

(a) an array of m sensors for sensing the signals from the n emitters and the noise;

(b) a processor for identifying a sensor correlation matrix of the sensed signals and noise and the m eigenvalues $\lambda_k$ (k=1, ... m) thereof;

(c) means for scaling said eigenvalues $\lambda_k$ by dividing each by noise power $\sigma^2$ to create scaled eigenvalues $\lambda_k'$;

(d) means for determining an arithmetic mean (AM) of the scaled eigenvalues;

(e) means for evaluating the difference between a scaled eigenvalue $\lambda_k'$ and an AM of the scaled eigenvalues $\lambda_1'$, ..., $\lambda_{k-1}'$ to determine whether $\lambda_k'$ increases sufficiently to declare n=m−k, stepping k from 1 to m until the increase is sufficient; and (f) means for providing the declared number of emitters n to the system so that the characteristics of the signals can be determined.

15. The system of claim 14 wherein the increase in scaled eigenvalue $\lambda_k'$ from the AM of the scaled eigenvalues $\lambda_{k-1}'$ is sufficient to declare $n=m-k$ when $$\lambda_k' - \bar{\lambda} > \alpha_k \sqrt{AM_\lambda},$$

where $\bar{\lambda}$ is the arithmetic mean of the k−1 scaled eigenvalues $\lambda_1', \ldots, \lambda_{k-1}'$ and $AM_\lambda$ is the arithmetic mean of all the m scaled eigenvalues $\lambda_k'$.

16. The system of claim 15 where $\alpha_k \approx 1$ for uncorrelated, equal-level noise and $\alpha_k \approx \frac{1}{2}$ for correlated, unequal-level noise.

17. The system of claim 15 further comprising means for declaring $n=m-k$ when $$\mu_k - \bar{\mu} > \beta_k \sqrt{AM_\mu},$$

where $\mu_k$ is the slope of the scaled eigenvalues $\lambda_k$, $\bar{\mu}$ is the arithmetic mean of the first k−1 scaled eigenvalue differences $\mu_1, \ldots, \mu_{k-1}$, and $AM_\mu$ is the arithmetic mean of the m−1 eigenvalue slopes $\mu_k$.

18. A system for identifying the characteristics of signals received from n emitters in the presence of noise at an array of sensors in which a subsystem for estimating the number of emitters n comprises;
   (a) an array of m sensors for sensing the signals from the n emitters and the noise;
   (b) a processor for identifying a sensor correlation matrix of the sensed signals and noise and the eigenvalues thereof;
   (c) means for evaluating the difference between one of the eigenvalues and an average of preceding ones thereof to determine whether the one eigenvalue is related to noise; and
   (d) means for providing the number of said eigenvalues related to noise to the system so that the characteristics of the signals can be determined.

19. The system of claim 18 wherein said means for evaluating comprises means for determining whether the difference between the one eigenvalue and the average of the preceding eigenvalues equals or exceeds a constant times the square root of the arithmetic mean of all of the eigenvalues.

20. The system of claim 18 further comprising means for comparing the slope of the one eigenvalue to the average of the slopes of the preceding eigenvalues to determine whether the one eigenvalue is related to noise.

21. A system for identifying the characteristics of signals received at an array of sensors in the presence of noise that requires an estimate of the number of emitters having signals received at the array of sensors in which a subsystem for estimating the number of emitters n comprises:
   (a) an array of m sensors for sensing the signals from the n emitters and the noise;
   (b) a processor for identifying a sensor correlation matrix of the sensed signals and noise and the m eigenvalues $\lambda_k$ (k=1, ..., m) thereof;
   (c) means for scaling said eigenvalues $\lambda_k$ by dividing each by a noise power $\sigma^2$ to create scaled eigenvalues $\lambda_k'$;
   (d) means for increasing each of the scaled eigenvalues $\lambda_k'$ by an amount $\Delta$ that is approximately the noise power $\sigma^2$ to create revised eigenvalues;
   (e) means for evaluating the flatness f of the revised eigenvalues to provide an estimate of n, the number of emitters; and
   (f) means for providing the estimated number of emitters n to the systems so that the characteristics of the signals can be determined.

22. The system of claim 21 further comprising means for determining an arithmetic mean (AM) of the first k scaled and shifted eigenvalues, and wherein the amount $\Delta = \alpha_k \sqrt{AM}$.

23. The system of claim 21 further comprising means for determining a geometric mean (GM) and an AM of the scaled and shifted eigenvalues $\lambda_k'$, and wherein said means for evaluating the flatness f uses $f = -\log_e(GM/AM)^k$ for the first k scaled and shifted eigenvalues $\lambda_k'$, stepping k from 1 to m, with $n=m-k$ when f is minimized.

* * * * *